(12) United States Patent
Ebrahimi Afrouzi

(10) Patent No.: US 11,921,515 B1
(45) Date of Patent: *Mar. 5, 2024

(54) SYSTEM AND METHOD FOR CONFINING ROBOTIC DEVICES

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,775

(22) Filed: Mar. 13, 2023

Related U.S. Application Data

(63) Continuation of application No. 17/071,424, filed on Oct. 15, 2020, now Pat. No. 11,625,047, which is a continuation of application No. 15/674,310, filed on Aug. 10, 2017, now Pat. No. 10,845,817.

(60) Provisional application No. 62/373,512, filed on Aug. 11, 2016.

(51) Int. Cl.
| | |
|---|---|
| G05D 1/00 | (2006.01) |
| B25J 9/16 | (2006.01) |
| G06T 7/521 | (2017.01) |
| G06T 7/70 | (2017.01) |
| G06V 10/74 | (2022.01) |
| G06V 20/56 | (2022.01) |

(52) U.S. Cl.
CPC ......... *G05D 1/0248* (2013.01); *B25J 9/1684* (2013.01); *G05D 1/0214* (2013.01); *G05D 1/0236* (2013.01); *G05D 1/024* (2013.01); *G06T 7/521* (2017.01); *G06T 7/70* (2017.01); *G06V 10/74* (2022.01); *G06V 20/56* (2022.01); *G05D 2201/0203* (2013.01); *G05D 2201/0207* (2013.01); *G06T 2207/30252* (2013.01)

(58) Field of Classification Search
CPC ....... Y10S 901/01; Y10S 901/09; B25J 5/007; B25J 9/1674; G01S 5/12; G01S 5/16; A01D 34/008; A01D 2101/00; G05D 2201/0208; G05D 2201/0215; G05D 1/0265; G05D 1/0234; G05D 1/0236
See application file for complete search history.

(56) References Cited

U.S. PATENT DOCUMENTS

| | | | |
|---|---|---|---|
| 2010/0030379 A1* | 2/2010 | Parlantzas | G05D 1/0234 901/50 |
| 2015/0301338 A1* | 10/2015 | Van Heugten | G09G 3/32 345/8 |
| 2017/0238055 A1* | 8/2017 | Chang | H04N 21/4662 725/19 |
| 2018/0035606 A1* | 2/2018 | Burdoucci | A01D 34/84 |

* cited by examiner

*Primary Examiner* — Dalena Tran

(57) ABSTRACT

A method for determining at least one action of a robot, including capturing, with an image sensor disposed on the robot, images of objects within an environment of the robot as the robot moves within the environment; identifying, with a processor of the robot, at least a first object based on the captured images; and actuating, with the processor, the robot to execute at least one action based on the first object identified, wherein the at least one action comprises at least generating a virtual boundary and avoiding crossing the virtual boundary.

20 Claims, 4 Drawing Sheets

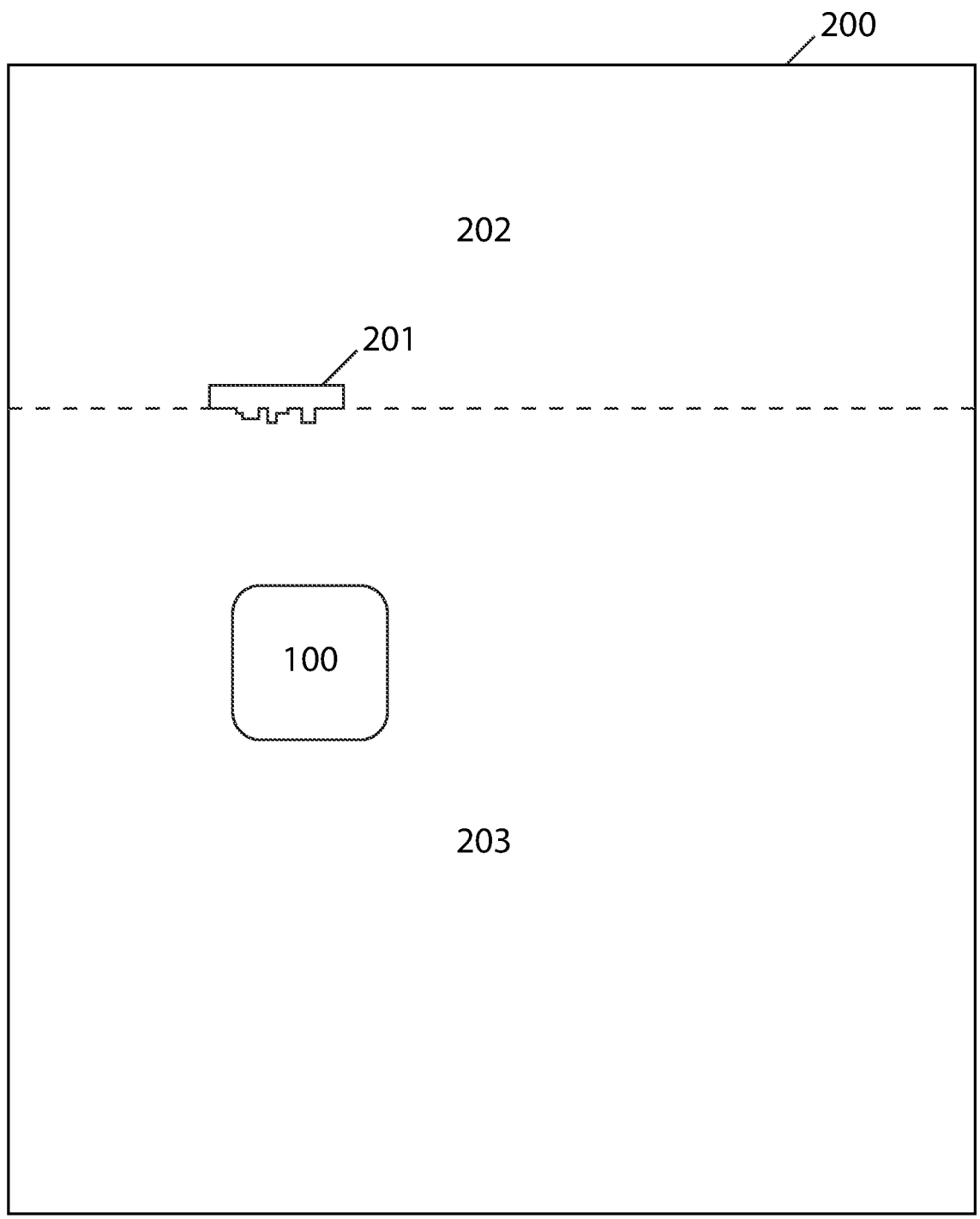

SYSTEM AND METHOD FOR CONFINING ROBOTIC DEVICES

CROSS-REFERENCE TO RELATED APPLICATIONS

This Application is a Continuation of U.S. Non-Provisional Patent Application Ser. No. 17/071,424, filed Oct. 15, 2020, which is a Continuation of U.S. Non-Provisional patent application Ser. No. 15/674,310, filed Aug. 10, 2017, which claims the benefit of U.S. Provisional Patent Application No. 62/373,512, filed Aug. 11, 2016, each of which is hereby incorporated by reference.

FIELD OF THE DISCLOSURE

The present invention relates to robotic systems, and more particularly, to methods for confining or limiting the movement of robotic devices.

BACKGROUND

Several systems for confining robotic devices to specific physical space for the purpose of performing work have been proposed in prior art. Such work may include floor cleaning, lawn care, and transportation. One approach toward confining robotic devices may be the use of large physical barriers to block the robotic device from entering, or becoming proximate with, one or more objects and/or areas of operation. However, this solution is neither efficient nor practical as physical barriers may encumber routine movement throughout the area of operation and an undesirable degree of human intervention is required. In prior art, sophisticated navigation systems have been used whereby the robot is trained or programmed to travel along predetermined paths or its position is monitored within a stored map. In such navigation systems large amounts of memory are required to store information related to each location. This is undesirable, particularly in cases where the robotic device is to be used in various locations as a large amount of memory would be required. The robotic device may also need to be trained or re-programmed for each new location or each time the work area is changed which is unpractical for consumer use. Other approaches in prior art include the installation of cables or wires to define the boundary of an area. These may be aesthetically unpleasing and can be a tripping hazard. Furthermore, installation may be difficult as cables or wires are ideally to be placed underground or beneath carpet. These methods mentioned in addition to other prior art proposed may not be ideal as they often require the use of additional equipment and substantial setup. The present invention addresses these issues by introducing a method for confining and/or modifying the movement of a robotic device by means of a recognizable boundary component which may already pre-exist within the working area. Once recognized, the boundary component can be used to erect virtual boundaries.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for determining at least one action of a robot, including capturing, with an image sensor disposed on the robot, images of objects within an environment of the robot as the robot moves within the environment; identifying, with a processor of the robot, at least a first object based on the captured images; and actuating, with the processor, the robot to execute at least one action based on the first object identified, wherein the at least one action comprises at least generating a virtual boundary and avoiding crossing the virtual boundary.

Some aspects provide a robot, including a chassis; a set of wheels coupled to the chassis; an image sensor; a processor; and a memory storing instructions that when executed by the processor effectuates operations including capturing, with the image sensor, images of objects within an environment of the robot as the robot moves within the environment; identifying, with the processor, at least a first object based on the captured images; and actuating, with the processor, the robot to execute at least one action based on the first object identified, wherein the at least one action comprises at least generating a virtual boundary and avoiding crossing the virtual boundary.

Some aspects provide a memory storing instructions that when executed by a processor of a robot effectuates operations including capturing, with an image sensor disposed on the robot, images of objects within an environment of the robot as the robot moves within the environment; identifying, with a processor of the robot, at least a first object based on the captured images; and actuating, with the processor, the robot to execute at least one action based on the first object identified, wherein the at least one action comprises at least generating a virtual boundary and avoiding crossing the virtual boundary.

BRIEF DESCRIPTION OF THE DRAWINGS

FIG. 2 illustrates a top view of the operation of a confinement system with robotic device and an example of a boundary component, according to some embodiments.

DETAILED DESCRIPTION OF SOME EMBODIMENTS

Figure 1A:
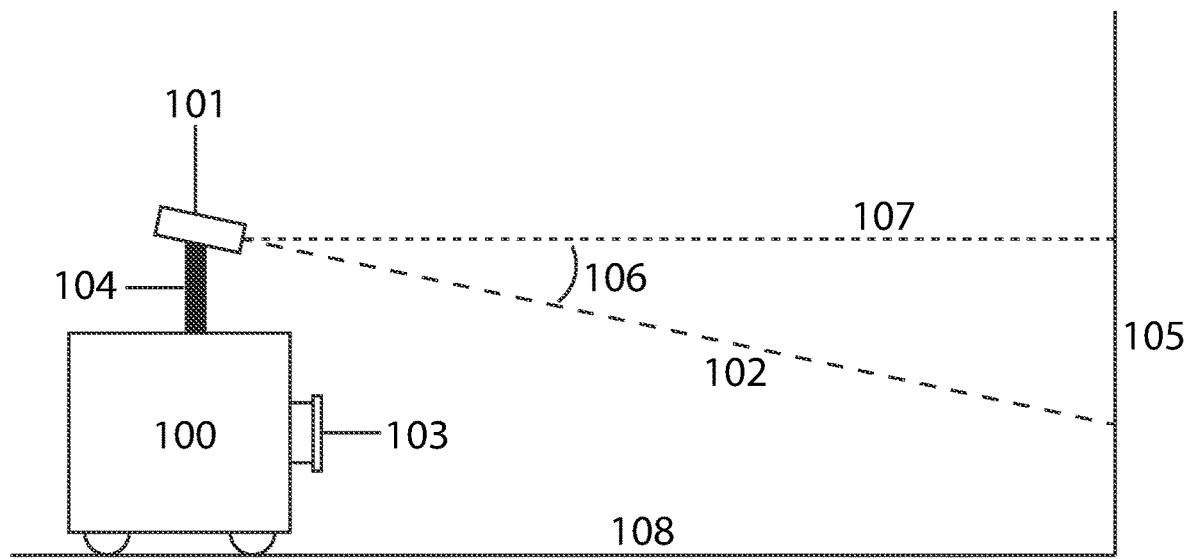
FIG. 1A illustrates a side view of a robotic device with an image sensor and line laser diode, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to providing virtual boundaries and location indicators for limiting surface coverage and navigating robotic devices.

As understood herein, the term "image sensor" may be defined generally to include one or more sensors that detect and convey the information that constitutes an image by converting the variable attenuation of light waves into signals. The term "image processor" may be defined generally to include an image processing engine or media processor that uses signal processing to extract characteristics or parameters related to an input image.

As understood herein, the term "robot" or "robotic device" may be defined generally to include one or more autonomous or semi-autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor and/or controller that processes and/or controls motors and other robotic autonomous or cleaning operations, network or wireless communications, power management, etc., and one or more clock or synchronizing devices.

Some embodiments include a system and method for confining and/or modifying the movement of robotic devices.

In some embodiments, the movement of a robotic device is confined or limited by means of a boundary component. The boundary component is placed within an area co-located with the robotic device. The boundary component may have a predefined pattern in form of a predetermined surface indentation pattern that may be discerned by a sensor component installed onto the robotic device.

A robotic device configured with a line laser emitting diode, an image sensor, and an image processor detects predetermined indentation patterns of surfaces within a specific environment. The line laser diode emits the line laser upon surfaces within the field of view of the image sensor. The image sensor captures images of the projected line laser and sends them to the image processor. The image processor iteratively compares received images against the predetermined surface indentation pattern of the boundary component. Once the predefined pattern in the form of the predetermined indentation pattern is detected the robotic device may mark the location within the working map of the environment. This marked location, and hence boundary component, may be used in confining and/or modifying the movements of the robotic device within or adjacent to the area of the identified location. This may include using the marked location to avoid or stay within certain areas or execute pre-programmed actions in certain areas.

Some embodiments include a method for confining or limiting the movement of robotic devices by means of a boundary component. The boundary component is placed within an area co-located with the robotic device. The boundary component may have a predefined pattern in the form of a predetermined surface indentation pattern that may be recognized by the robotic device and used to identify boundaries. A robotic device configured with a line laser emitting diode, an image sensor, and an image processor detects predetermined indentation patterns of surfaces within a specific environment. The image sensor and image processor detect the predetermined indentation pattern by continuously analyzing the projections of the line laser diode disposed on the robotic device. The line laser diode emits the line laser upon surfaces within the field of view of the image sensor. The image sensor captures images of the projected line laser and sends them to the image processor. The image processor iteratively compares received images against the predetermined surface indentation pattern of the boundary component. Once the predefined pattern in the form of the predetermined indentation pattern is detected the robotic device may mark the location within the working map of the environment. This marked location, and hence boundary component, may be used in confining and/or modifying the movements of the robotic device within or adjacent to the area of the identified location. This may include using the marked location as a boundary to avoid or stay within certain areas or execute pre-programmed actions in certain areas. For example, areas adjacent to the boundary component may be marked as off-limit areas by the robotic device thereby confining and/or modifying its movement within the working area. The boundary component may be placed at any desired location to erect a virtual boundary to limit or confine the movement of the robotic device.

FIG. 1A illustrates a side view of a robotic device with an image sensor and line laser diode. The robotic device 100 includes image sensor 103 and line laser diode 101 which is mounted on the robotic device 100 by connecting member 104. Dashed line 102 represents the emissions from line laser diode 101. The line laser diode is positioned to emit the line laser at a slight downward angle 106 with respect to the work surface plane 108. Line 107 is shown for reference and is parallel to work surface 108. The line laser emissions emitted by line laser diode 101 are projected onto surfaces in front of the device, surface 105 in this particular case.

Figure 1B:
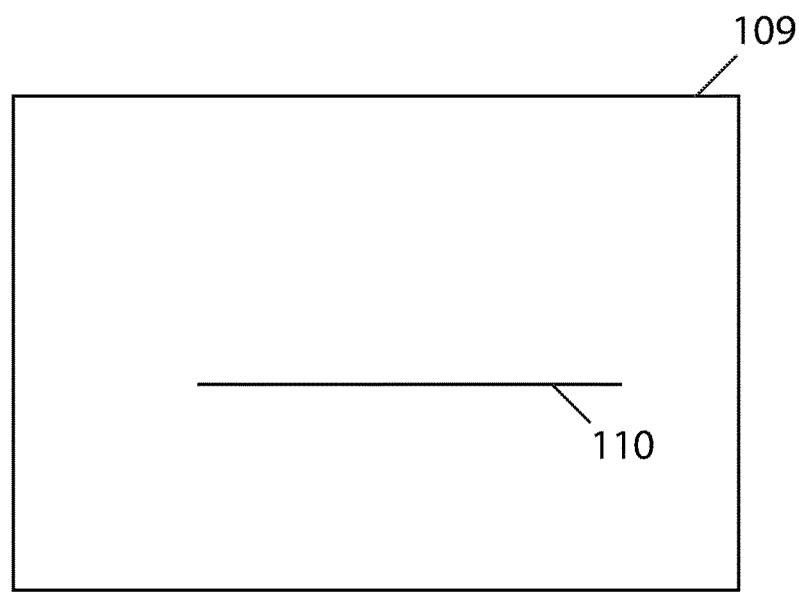
FIG. 1B illustrates a front view of an image captured of the line laser projected onto the flat surface in FIG. 1A.

FIG. 1B illustrates a front view of the corresponding image captured by image sensor 103 of the line laser projected onto surface 105. The frame 109 represents the field of view of the image sensor 103. Line 110 represents the line laser projected by line laser diode 101 in FIG. 1A onto surface 105. Since surface 105 is flat, the projected line in the captured image is not skewed in any direction. A line laser projected onto uneven surfaces or surfaces with indentations will produce skewed or disjointed projections. Projected lines will appear larger as the distance to the surface on which the line laser is projected increases and will appear smaller as this distance decreases. Additionally, projected lines will appear lower as distance to the surface on which the line laser is projected increases as the line laser diode is angled downward with respect to the work surface plane. It should be noted that the line laser diode may alternatively be angled upward relative to the plane of the work surface, and projected lines in such cases will appear higher as distance to the surface increases.

FIG. 2 illustrates a top view of the operation of the confinement system. A boundary component 201 and robotic device 100 are co-located within work area 200. The surface of boundary component 201 has a specific indentation pattern. The indentation pattern in the boundary component shown is an example. The indentation pattern can be in various configurations. The particular image produced by a line laser projected onto the surface of boundary component 201 shall be pre-programmed in a memory unit of the robotic device. The image processor iteratively compares received images against the pre-programmed surface indentation pattern of the boundary component. A margin of error may be defined to allow for a small amount of miscalculation or distortion.

In some embodiments, once the predetermined indentation pattern is detected the robotic device is configured to mark the location within the working map of the environment and draw a virtual boundary along the plane of the indentation pattern. As shown in FIG. 2, this would have the effect of dividing work area 200 into two zones: workspace 203 and off-limit zone 202 established by boundary component 201. It should be noted that the robotic device may be configured to take any variety of actions as a result of identifying the indentation pattern without limitation. For example, a robotic device may be configured to execute a first set of operations on a first side of a boundary component and a second set of operations on a second side of the boundary component. Or a robotic device may be configured to confine itself to one side of the boundary component for a predetermined amount of time. Or a robotic device may be configured to avoid crossing the virtual boundary. Or a robotic device may be configured to stay on a first and/or a second side of the virtual boundary. Or a robotic device may be configured to perform a deep cleaning of the area inside the virtual boundary.

Figure 3A:
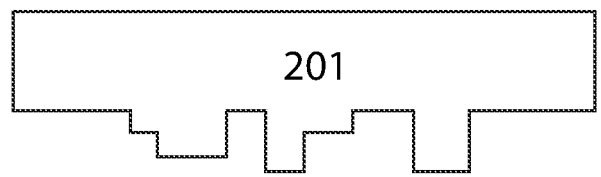
FIG. 3A illustrates a top view of an example boundary component, according to some embodiments.
Figure 3B:
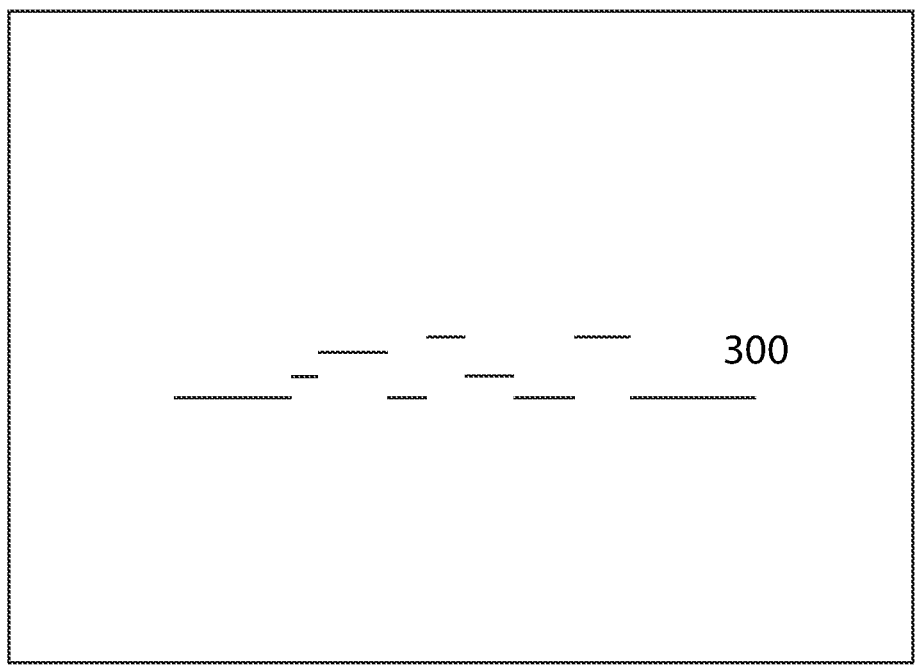
FIG. 3B illustrates a front view of an image captured of the line laser projected onto the surface of the example boundary component in FIG. 3A.

FIG. 3A illustrates a top view of boundary component 201. FIG. 3B illustrates a front view of the image captured of the line laser projected onto the surface of boundary component 201. The resulting indentation pattern produced is disjointed line 300 wherein different portions of the line appear staggered. Lines positioned lower correspond with areas of the indentation pattern which are further in distance from the image sensor while lines positioned higher correspond with areas of the indentation pattern which are closer in distance. The indentation pattern and thus corresponding disjointed lines are an example and are not limited to what is shown.

Figure 4:
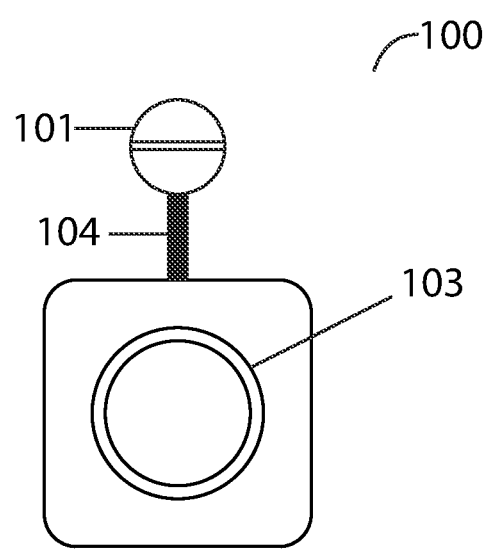
FIG. 4 illustrates a front view of a robotic device, according to some embodiments.

FIG. 4 illustrates a front view of robotic device 100. Robotic device 100 includes image sensor 103 and line laser diode 101 attached by connecting member 104.

The foregoing descriptions of specific embodiments of the invention have been presented for purposes of illustration and description. They are not intended to be exhaustive or to limit the invention to the precise forms disclosed.

The invention claimed is:

1. A method for determining at least one action of a robot, comprising:
    capturing, with an image sensor disposed on the robot, images of objects within an environment of the robot as the robot moves within the environment;
    identifying, with a processor of the robot, at least a first object based on the captured images; and
    actuating, with the processor, the robot to execute at least one action based on the first object identified, wherein the at least one action comprises at least generating a virtual boundary and avoiding crossing the virtual boundary.

2. The method of claim 1, further comprising:
    marking, with the processor, a location of the at least one object in a map of the environment.

3. The method of claim 1, wherein identifying the at least one object further comprises:
    comparing, with the processor, the captured images with at least one image saved in a memory of the robot; and
    identifying, with the processor, a match between at least one of the captured images and at least one of the at least one saved image.

4. The method of claim 1, further comprising:
    identifying, with the processor of the robot, at least a second object based on the captured images; and
    actuating, with the processor, the robot to execute at least one action based on the second object identified, wherein the at least one action comprises modifying a movement path of the robot.

5. The method of claim 1, further comprising:
    identifying, with the processor of the robot, at least a second object based on the captured images; and
    actuating, with the processor, the robot to execute at least one action based on the second object identified, wherein the at least one action comprises a particular cleaning task.

6. The method of claim 1, further comprising:
    identifying, with the processor of the robot, at least a second object based on the captured images; and
    actuating, with the processor, the robot to execute at least one action based on the second object identified, wherein the at least one action comprises executing a first task in a first area of the environment and then executing a second task in a second area of the environment.

7. The method of claim 1, further comprising:
    dividing, with the processor, the environment into two or more zones; and
    emitting, with a light emitter disposed on the robot, a light on surfaces of the objects within the environment, wherein the captured images comprise a projection of the light on the surfaces of the objects.

8. The method of claim 7, further comprising:
    determining, with the processor, a distance of the surfaces of the objects relative to the robot based on a position or size of the projected light on the surfaces of the objects in the captured images.

9. A robot, comprising:
    a chassis;
    a set of wheels coupled to the chassis;
    an image sensor;
    a processor; and
    a memory storing instructions that when executed by the processor effectuates operations comprising:
        capturing, with the image sensor, images of objects within an environment of the robot as the robot moves within the environment;
        identifying, with the processor, at least a first object based on the captured images; and
        actuating, with the processor, the robot to execute at least one action based on the first object identified, wherein the at least one action comprises at least generating a virtual boundary and avoiding crossing the virtual boundary.

10. The robot of claim 9, wherein identifying the at least one object further comprises:

comparing, with the processor, the captured images with at least one image saved in a memory of the robot; and identifying, with the processor, a match between at least one of the captured images and at least one of the at least one saved image.

11. The robot of claim 9, wherein the operations further comprise:

identifying, with the processor of the robot, at least a second object based on the captured images; and actuating, with the processor, the robot to execute at least one action based on the second object identified, wherein the at least one action comprises modifying a movement path of the robot.

12. The robot of claim 9, wherein the operations further comprise:

identifying, with the processor of the robot, at least a second object based on the captured images; and actuating, with the processor, the robot to execute at least one action based on the second object identified, wherein the at least one action comprises a particular cleaning task.

13. The robot of claim 9, wherein the operations further comprise:

dividing, with the processor, the environment into two or more zones; and emitting, with a light emitter disposed on the robot, a light on surfaces of the objects within the environment, wherein the captured images comprise a projection of the light on the surfaces of the objects.

14. The robot of claim 13, wherein the operations further comprise:

determining, with the processor, a distance of the surfaces of the objects relative to the robot based on a position or size of the projected light on the surfaces of the objects in the captured images.

15. A memory storing instructions that when executed by a processor of a robot effectuates operations comprising:

capturing, with an image sensor disposed on the robot, images of objects within an environment of the robot as the robot moves within the environment;

identifying, with a processor of the robot, at least a first object based on the captured images; and actuating, with the processor, the robot to execute at least one action based on the first object identified, wherein the at least one action comprises at least generating a virtual boundary and avoiding crossing the virtual boundary.

16. The memory of claim 15, wherein identifying the at least one object further comprises:

comparing, with the processor, the captured images with at least one image saved in a memory of the robot; and identifying, with the processor, a match between at least one of the captured images and at least one of the at least one saved image.

17. The memory of claim 15, wherein the operations further comprise:

identifying, with the processor of the robot, at least a second object based on the captured images; and actuating, with the processor, the robot to execute at least one action based on the second object identified, wherein the at least one action comprises modifying a movement path of the robot.

18. The memory of claim 15, wherein the operations further comprise:

identifying, with the processor of the robot, at least a second object based on the captured images; and actuating, with the processor, the robot to execute at least one action based on the second object identified, wherein the at least one action comprises a particular cleaning task.

19. The memory of claim 15, wherein the operations further comprise:

dividing, with the processor, the environment into two or more zones; and emitting, with a light emitter disposed on the robot, a light on surfaces of the objects within the environment, wherein the captured images comprise a projection of the light on the surfaces of the objects.

20. The memory of claim 15, wherein the operations further comprise:

determining, with the processor, a distance of the surfaces of the objects relative to the robot based on a position or size of the projected light on the surfaces of the objects in the captured images.

* * * * *